United States Patent [19]

Higaki

[11] Patent Number: 5,111,373
[45] Date of Patent: May 5, 1992

[54] PWM-CONTROLLED POWER SUPPLY INCLUDING CHOKE COIL WITH 3-WINDINGS

[75] Inventor: Shigetoshi Higaki, Tokyo, Japan

[73] Assignee: Kabushiki Kaisha Toshiba, Kawasaki, Japan

[21] Appl. No.: 647,026

[22] Filed: Jan. 29, 1991

[30] Foreign Application Priority Data

Feb. 1, 1990 [JP] Japan .................................. 2-20444

[51] Int. Cl.⁵ .......................................... H02M 5/458
[52] U.S. Cl. ........................................ 363/37; 363/39; 363/124
[58] Field of Search ................. 363/34, 37, 39, 41, 363/124

[56] References Cited

U.S. PATENT DOCUMENTS

| | | | |
|---|---|---|---|
| 4,750,102 | 6/1988 | Yamano et al. | 363/142 |
| 4,849,950 | 7/1989 | Sugiura et al. | 363/37 |
| 5,017,800 | 5/1991 | Divan | 363/37 |

OTHER PUBLICATIONS

Gerbitz, C. G., *IBM Technical Disclosure Bulletin*, "Full-Wave Rectifier and Regulator", vol. 15, No. 11, Apr. 1973, pp. 3459 and 3460.

Leonhard, W. et al., EPE'89 Third Day of Conference, vol. 3, 3rd European Conference on Power Electronics and Applications, Aachen, Oct. 9–12, 1989, pp. 1115–1120.

Primary Examiner—Jeffrey Sterrett
Attorney, Agent, or Firm—Foley & Lardner

[57] ABSTRACT

In a PWM control type power supply apparatus, a modulation (high frequency) signal component is eliminated not only from AC input, but also AC output. The PWM control type power supply apparatus includes: an AC-to-DC converting unit capable of supplying a first AC voltage having a source frequency from a pair of output terminals, for converting the first AC voltage to obtain a positive DC (direct current) voltage from a positive half cycle and a negative DC voltage from a negative half cycle of the first AC voltage appearing at one output terminal with a common voltage appearing at another output terminal; a DC-to-AC inverter unit including a pair of first and second switching elements, and a PWM (pulse width modulation) controller for controlling switching operations of the first and second switching elements in a PWM control mode so as to invert the positive and negative DC voltage into a second AC voltage having a modulation frequency higher than the source frequency the second AC voltage being applied to a load; and a choke coil having a single core and first, second and third coil windings wound on the single core for magnetically coupling the coil windings with each other, the first and second coil windings being interposed between the AC power source and the AC-to-DC converting means, and also the third coil winding being interposed between the DC-to-AC inverter unit and the load.

4 Claims, 3 Drawing Sheets

PWM-CONTROLLED POWER SUPPLY INCLUDING CHOKE COIL WITH 3-WINDINGS

BACKGROUND OF THE INVENTION

1. Field of the Invention

The present invention generally relates to a PWM (pulsewidth modulation) control type power supply apparatus. More specifically, the present invention is directed to a PWM-controlled power supply apparatus capable of eliminating modulation-frequency signal components (noises) from ground potentials at input-/output sides thereof.

2. Description of the Related Art

In FIG. 1, there is shown a circuit diagram of a conventional PWM control power supply apparatus. Two diodes 2 and 3 are connected to a AC (alternating current) power source 1.

Capacitors 4 and 5 are also connected to the AC power source 1 so as to constitute an AC-to-DC converting circuit. In this case, a line of the AC power source 1 connected to a ground line is connected to a junction point series-connected between these capacitors 4 and 5. A main DC-to-AC inverter circuit 6 is connected to an output of the AC/DC converting circuit. The DC/AC inverter circuit 6 is arranged by both series-connected switching elements 61 and 62, and diodes cross-coupled with the respective switching elements. An output voltage of this inverter circuit 6 appears across a junction point "A" between these switching elements 61 and 62, and also another junction point "N" between these capacitors 4 and 5. This output voltage is applied via a filter 7 to a load 8. An PWM (pulsewidth modulation) controller 9 is connected to the switching elements 61 and 62 employed in the main inverter circuit 6 in the known pulsewidth modulation method.

In the above-described conventional PWM-controlled power supply apparatus, when the pulse-width modulation frequency is selected to be a high value, e.g., 20 KHz, high frequency (high modulation frequency) noises in a common mode may happen to occur which is negligible with respect to the ground potentials of the input/output terminals of such power supply apparatus. That is, while turning ON/OFF the switching elements 61 and 62, a ground potential appearing at the point "A" is alternately switched based upon voltage values of "VP" and "VN". As a result, charge/discharge currents to a stray capacitance "C₀" existing between this point "A" and the ground will flow through the ground line "N" in a pulsatory form, thereby resulting a voltage drop.

This stray capacitance "C₀" is necessarily produced between such a module type switching element and the major circuit arrangement, i.e., a housing of the PWM control type power supply apparatus. Precisely speaking, this stray capacitance "C₀" may be determined by a stray capacitance inherent to the switching element and another stray capacitance caused by the housing of the power supply apparatus, and may not be reduced to a predetermined value.

As previously described, the higher the modulation frequency of the DC/AC inverter 6 becomes with employment of a switching element having a high-speed switching characteristic, the greater the voltage variation velocity "dv/dt" at the point "A" becomes. As a result, the charge/discharge currents to the stray capacitance "C₀" analogously become large and thus the above-described voltage drop is no longer negligible.

Under such high modulation frequencies, high modulation-frequency noises (common mode noises) may be contained in both the input terminal and also the output terminal of the conventional PWM control power supply apparatus. Accordingly, no sufficient noise protection is taken in the above-described conventional PWM control type power supply apparatus when such a load having a highly noise-sensitive characteristic is connected thereto. Moreover, there is a risk that electronic appliances parallel-coupled to the input side of this conventional power supply apparatus may be erroneously operated due to such high modulation-frequency noises.

SUMMARY OF THE INVENTION

The present invention has been designed to solve the above-described problems of the conventional power supply apparatus, and therefore has an object to provide an PWM-control type power supply apparatus capable of considerably removing the high modulation-frequency noises from the input and output voltages thereof.

Another object of the present invention is to provide an PWM-control type power supply apparatus capable of giving adverse noise influences to the input power supply line.

A still further object of the present invention is to provide an PWM-control type power supply apparatus connectable with loads having highly noise-sensitive characteristics.

To achieve the above described objects and features of the present invention, an PWM-control type power supply apparatus comprises:

AC-to-DC converting means (2:3) coupled to an AC (alternating current) power source (1) capable of supplying a first AC voltage having a source frequency from a pair of output terminals, for converting said first AC voltage to obtain a positive DC (direct current) voltage from a positive half cycle of said first AC voltage appearing at one output terminal of said output terminals and also a negative DC voltage from a negative half cycle of said first AC voltage appearing at said one output terminal with a common voltage appearing at another output terminal of said output terminals;

DC-to-AC inverter means (6:9) including a pair of first and second switching elements (63:64) and also a PWM (pulse width modulation) controller (9) for controlling switching operations of said first and second switching elements (63:64) in a PWM control mode so as to invert said positive and negative DC voltages into a second AC voltage having a modulation frequency higher than said source frequency, said second AC voltage being applied to a load (8); and, choke coil means (10) having a single core and first, second and third coil windings (101:102:103) wound on said single core for magnetically coupling said coil windings with each other, said first and second coil windings (101:102) being interposed between said AC power source (1) and said AC-to-DC converting means (2:3), and also said third coil winding (103) being interposed between said DC-to-AC inverter means (6:9) and said load.

BRIEF DESCRIPTION OF THE DRAWINGS

For a better understanding of the present invention, reference is made to read the following descriptions in conjunction with a accompanying drawings, in which.

DETAILED DESCRIPTION OF THE PREFERRED EMBODIMENTS

BASIC IDEA

In general, there are two typical choke coils, namely a normal mode choke coil and a common mode choke coil. In the normal mode chalk coil, when AC currents flow through coil windings of this choke coil, an inductance (magnetic flux) may be produced. To the contrary, when AC currents having the same values flow through coil windings of the common mode choke coil, no inductance or no magnetic flux may be produced under a normal state. However, if the AC currents flowing through the coil windings have different values, an inductance may be produced.

The present invention has been accomplished based upon the following recognition. That is to say, as previously explained, the charge/discharge currents may flow through the stray capacitance "$C_0$" due to the potential variations caused every time the major inverter circuit 6 performs the PWM-controlled switching operation. Since the PWM-controlled power supply apparatus of the present invention employs a common mode choke coil at input/output sides thereof, these charge/discharge currents may be suppressed by this common mode choke coil due to such a phenomenon that, as previously explained, the AC currents flowing through the coil windings of this common mode choke coil have different values. This is because the charge/discharge currents flow through the stray capacitance "$C_0$". As a consequence, the high modulation-frequency noises in a common mode contained in the input voltage and output voltage of this power supply apparatus may be sufficiently removed therefrom.

ARRANGEMENT OF FIRST PWM-CONTROLLED POWER SUPPLY APPARATUS

Figure 2:
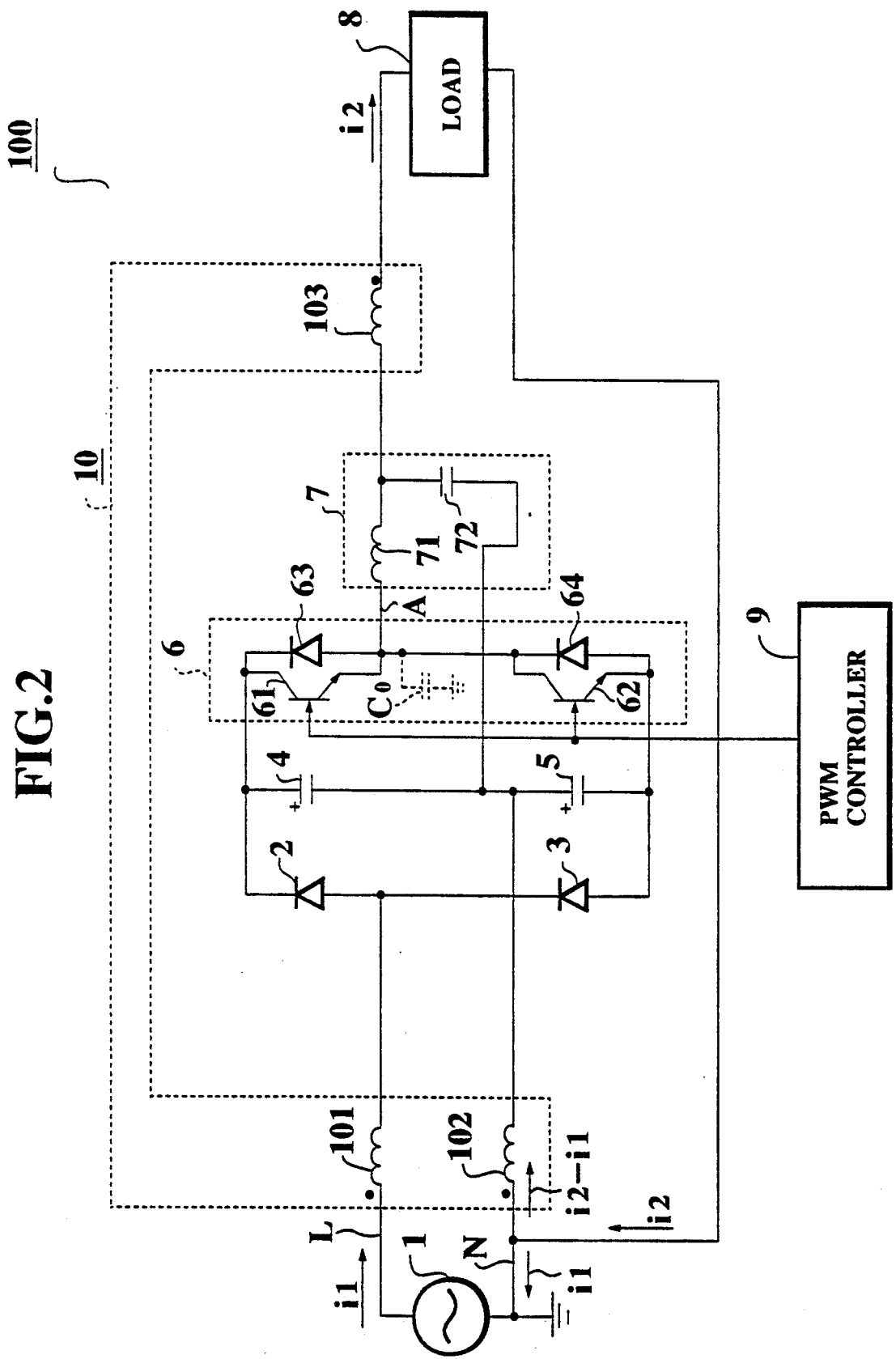
FIG. 2 is a schematic circuit diagram of a PWM-controlled power supply apparatus 100 according to a first preferred embodiment of the present invention; and, FIG. 3 is a schematic circuit diagram of a PWM-controlled power supply apparatus 200 according to a second preferred embodiment of the present invention.

Referring now to FIG. 2, an arrangement of an PWM-controlled power supply apparatus 100 according to a first preferred embodiment of the present invention will be described.

Figure 1:
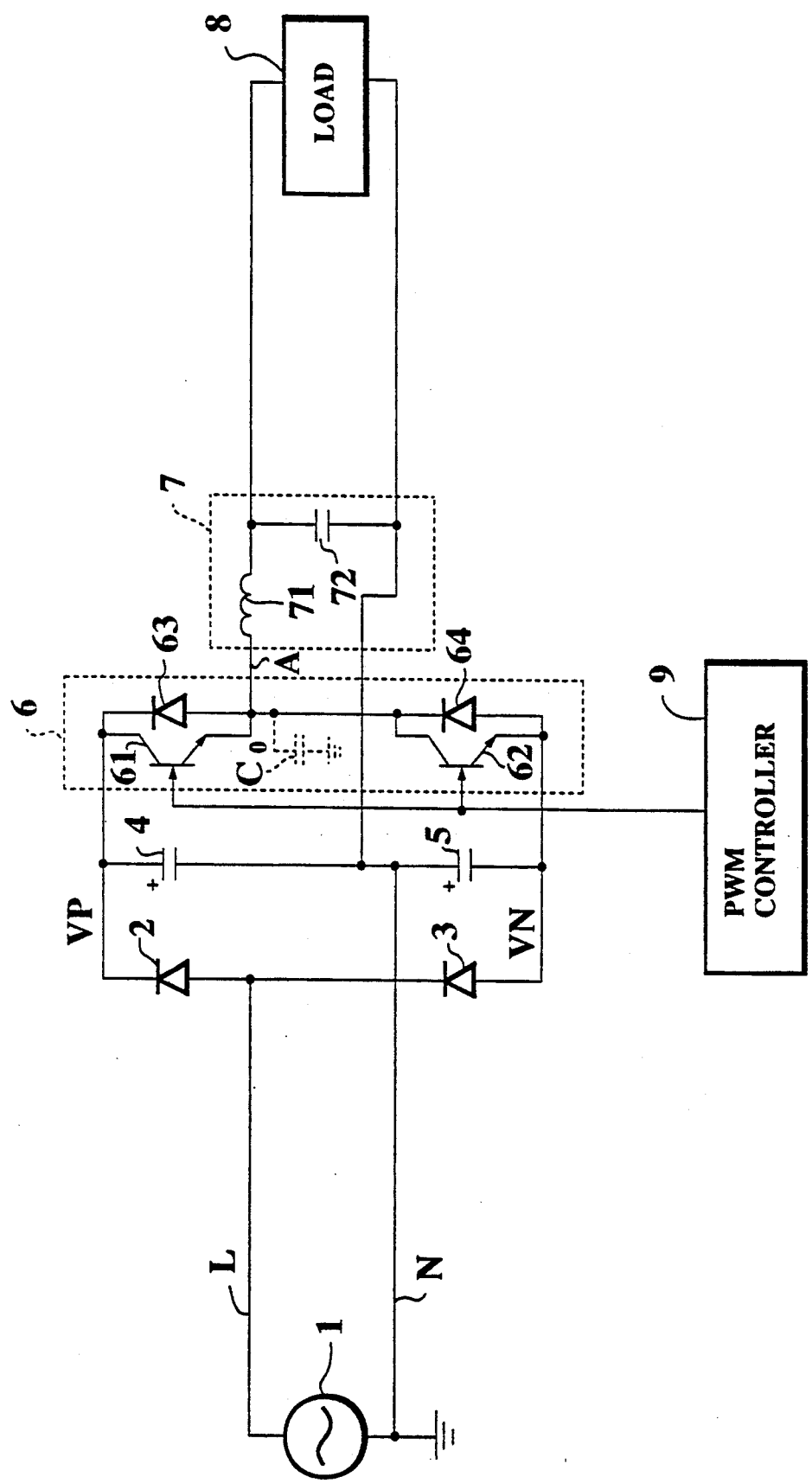
FIG. 1 is a schematic circuit diagram of the conventional PWM-controlled power supply apparatus.

As apparent from the circuit diagram shown in FIG. 2, a major circuit of the first PWM-controlled power supply apparatus 100 is the same as that of FIG. 1 and therefore, only a different or featured portion will now be described.

In the first PWM-controlled power supply apparatus 100, a common mode choke coil 10 is newly employed. The common mode choke coil 10 is constructed of a single common core and three coil windings 101, 102 and 103. The first coil winding 101 is inserted into one input line "L", namely between one terminal of the AC input power source 1 and the junction point of the series-connected diodes 2 and 3. The second coil winding 102 is inserted into the other input line "N", namely between the other terminal of the AC input power source 1 and the junction of the series-connected filtering capacitors 4 and 5. The third coil winding 103 is inserted into one output line, namely between the filter 7 and the load 8. The common mode choke coil is commmerically available, for instance, "TF6030T" type common mode choke coil from TDK in Japan.

COMMON MODE NOISE SUPPRESSION

As previously stated, a major feature of the first PWM-controlled power supply apparatus 100 is to employ such a common mode choke coil 10 at both the input/output sides thereof.

An idea of such common mode noise suppression will now be described more in detail with reference to FIG. 2.

The common mode choke coil 10 is so constructed that three coil windings 101, 102 are magnetically coupled via a ferrite core (not shown in detail) with each other. Both the first and second coil windings 101 and 102 are inserted into the input side of this PWM-controlled power supply apparatus 100, whereas the remaining third coil winding 103 is inserted into one output line of this power supply apparatus 100, and the other output line thereof is connected to a ground.

It is so designed that turning numbers of these first to third coil windings 101 through 103 are equal to each other and a summation of ampere turns of these coil windings 101 to 103 becomes zero. That is to say, assuming now that input/output currents "$i_1$" and "$i_2$" flow in a direction as shown in FIG. 2, the current "$i_1$" will flow through the first coil winding 101, the current "$i_2-i_1$" will flow through the second coil winding 102, and the current "$-i_2$" will flow through the third coil winding 103, and also the following relationship is satisfied under the normal condition except for the above-described switching operations (based on Kirchhoff's law):

$$i_1 + (i_2 - i_1) + (-i_2) = 0.$$

Accordingly, the summation of the ampere turns becomes zero under the normal condition. As a result, the ferrite core of this common mode choke coil 10 is not saturated with the magnetic flux.

Under the condition other than such a normal condition, namely, when the switching elements 61 and 62 are alternately turned ON/OFF, the charge/discharge currents will flow through the stray capacitance "$C_0$", so that the above-described relationship is no longer satisfied. However, in accordance with the principle idea of the present invention, both the first to third coil windings 101 to 103 of the common mode choke coil 10 function as a high impedance (high inductance) with respect to the switching operations, whereby the charge discharge currents many be suppressed by the common mode choke coil 10. As a consequence, the voltage drop caused by these charge/discharge currents appearing in the input line may be reduced to a negligible small value and also the potential variations of the output side of the power supply apparatus 100 with respect to the ground potential may be reduced to zero.

There is another particular advantage that two single-phase choke coils need not be independently employed at the input/output of the power supply apparatus in order to achieve the above-described noise suppression effect, but only one choke coil with three coil windings may be provided so as to sufficiently obtain such a noise suppression effect.

SECOND PWM-CONTROLLED POWER SUPPLY APPARATUS

Figure 3:
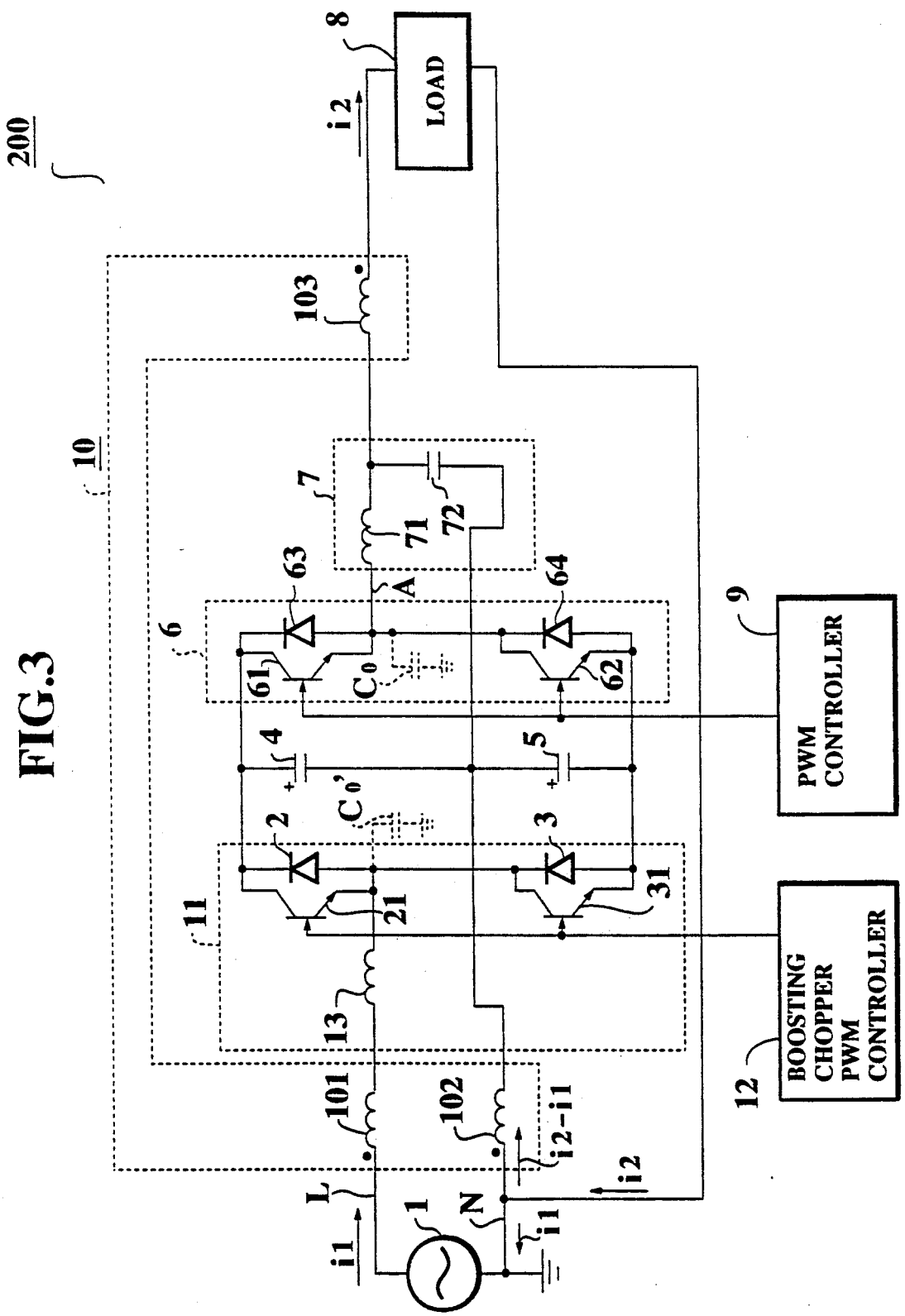

FIG. 3 is a circuit diagram of an PWM-controlled power supply apparatus 200 according to a second preferred embodiment of the invention.

Also, as apparent from this circuit diagram, since a major circuit portion of the second PWM-controlled power supply apparatus 200 is identical to that of the first PWM-controlled power supply apparatus 100 shown in FIG. 2, only a featured circuit arrangement thereof will now be explained.

Simply speaking, a boosting chopper circuit 11 is newly interposed between the common mode choke coil 10 and the filtering diodes 2 and 3. That is, third and fourth switching elements 21 and 31 are cross-coupled with these filtering diodes 2 and 3. A reactor 13 is connected between the first coil winding 101 of the common mode choke coil 10 and a junction point of the series-connected diodes 2 and 3, to which an emitter of the third switching transistor 21 and a collector of the fourth switching transistor 31 are connected. Moreover, a boosting chopper PWM controller 12 is connected to both base electrodes of the third and fourth switching transistors 21 and 22.

There is a particular advantage to employ such a boosting chopper circuit 11 in conjunction with the boosting chopper PWM controller 12, because the voltage drops occurring in the PWM switching operations may be compensated by this boosting chopper circuit 11. Accordingly, it is practically possible to set the voltage across the load 8 to be equal to the input voltage of the second PWM-controlled power supply apparatus 200. In other words, if the source voltage of the input power source 1 is 120 V, then the output voltage (namely, load voltage) of the second PWM-controlled power supply apparatus 200 may be selected to be 120 V.

A feature of the second PWM-controlled power supply apparatus 200 is as follows. Although the switching elements 21 and 31 of the boosting chopper circuit 11 which surely function as an additional noise source, are newly employed, as composed with the first PWM-controlled power supply apparatus 100, such strong high frequency noises may be considerably suppressed by way of the basic idea of the present invention, i.e., the common mode choke coil 10.

MODIFICATIONS

The present invention is not limited to the above-described preferred embodiments. For instance, although the input power source 1 was grounded in the first and second preferred embodiments, the input power source 1 may not be alternatively grounded whereas the load 8 may be grounded, whereby the same noise suppression effect may be achieved. Furthermore, if a battery is further coupled to the DC/AC inverter circuit, a PWM-control type uninterruptive power source (UPS) may be obtained. Also, many other switching elements than the bipolar transistors may be employed, for instance, an IGBT and a GTO. While the present invention has been described above, the ground potentials at the input/output sides of the PWM-controlled power supply apparatus no longer contain the high modulation-frequency switching noises or common mode noises because of the employment of the common mode choke coil in both the input/output sides of this power supply apparatus. Accordingly, any electronic appliances such as computer apparatuses having a highly noise sensitive characteristic may be connected as the load. Furthermore, since the ground potentials may be reduced to low levels, such a PWM-controlled power supply apparatus may be made compact, light and safe with high reliabilities.

What is claimed is:

1. A power supply apparatus comprising:
   AC-to-DC converting means coupled to an AC (alternating current) power source capable of supplying a first AC voltage having a source frequency from a pair of output terminals, for converting said first AC voltage to obtain a positive DC (direct current) voltage from a positive half cycle of said first AC voltage appearing at one output terminal of said output terminals and also a negative DC voltage from a negative half cycle of said first AC voltage appearing at said one output terminal with a common voltage appearing at another output terminal of said output terminals;
   DC-to-AC inverter means including a pair of first and second switching elements and also a PWM (pulse width modulation) controller for controlling switching operations of said first and second switching elements in a PWM control mode so as to invert said positive and negative DC voltages into a second AC voltage having a modulation frequency higher than said source frequency, said second AC voltage being applied to a load; and,
   choke coil means having a single core and first, second and third coil windings wound on said single core for magnetically coupling said coil windings with each other, said first and second coil windings being interposed between said AC power source and said AC-to-DC converting means, and also said third coil winding being interposed between said DC-to-AC inverter means and said load.

2. A power supply apparatus as claimed in claim 1, further comprising:
   boosting chopper means interposed between said first and second coil windings and said AC-to-DC converter means, for boosting said first AC voltage derived from said AC power source to obtain a third AC voltage higher than said first AC voltage.

3. A power supply apparatus as claimed in claim 2, wherein said boosting chopper means includes a pair of third and fourth switching elements, and also a boosting chopper PWM controller for controlling chopping operations of said third and fourth switching elements in the PWM control mode.

4. A power supply apparatus as claimed in claim 1, wherein said choke coil means includes a ferrite core and three coil windings wound on said ferrite core in such a manner that an ampere turn of each of said three coil windings is equal to each other.

* * * * *